(12) United States Patent
Sumpter et al.

(10) Patent No.: US 12,509,562 B2
(45) Date of Patent: Dec. 30, 2025

(54) EPOXY RESIN COMPOSITIONS AND DOWNHOLE USES THEREOF

(71) Applicant: Westlake Epoxy Inc., Houston, TX (US)

(72) Inventors: Matthew Sumpter, Richmond, TX (US); Ervin Mubarekyan, Stafford, TX (US); Mingbo He, Katy, TX (US)

(73) Assignee: Westlake Chemical Corp., Houston, TX (US)

( * ) Notice: Subject to any disclaimer, the term of this patent is extended or adjusted under 35 U.S.C. 154(b) by 0 days.

(21) Appl. No.: 18/813,845

(22) Filed: Aug. 23, 2024

(65) Prior Publication Data

US 2025/0075042 A1 Mar. 6, 2025

Related U.S. Application Data

(60) Provisional application No. 63/536,205, filed on Sep. 1, 2023.

(51) Int. Cl.
*C08J 3/24* (2006.01)
*E21B 33/138* (2006.01)

(52) U.S. Cl.
CPC ........... *C08J 3/241* (2013.01); *C08J 3/242* (2013.01); *E21B 33/138* (2013.01); *C08J 2363/00* (2013.01)

(58) Field of Classification Search
CPC .............. E21B 33/138; C05B 2363/00
See application file for complete search history.

(56) References Cited

U.S. PATENT DOCUMENTS

| | | | |
|---|---|---|---|
| 6,258,757 B1 | 7/2001 | Sweatman et al. | |
| 8,235,116 B1 | 8/2012 | Burts, Jr. et al. | |
| 10,604,694 B1 | 3/2020 | Berger et al. | |
| 2006/0258543 A1* | 11/2006 | Saini | C09K 8/12 507/219 |
| 2014/0303265 A1 | 10/2014 | Rey et al. | |
| 2016/0032172 A1* | 2/2016 | Pursley | C09K 8/62 166/305.1 |
| 2016/0264833 A1* | 9/2016 | Stone | C09K 8/12 |
| 2018/0037792 A1* | 2/2018 | Champagne | C09K 8/40 |
| 2019/0264094 A1* | 8/2019 | Hill | C09K 8/86 |
| 2021/0284898 A1 | 9/2021 | Palla-Venkata et al. | |
| 2022/0267664 A1 | 8/2022 | Al-Safran et al. | |

FOREIGN PATENT DOCUMENTS

| | | |
|---|---|---|
| WO | 2008147658 A1 | 12/2008 |
| WO | 2014116646 A1 | 7/2014 |
| WO | 2014164044 A1 | 10/2014 |

OTHER PUBLICATIONS

International Search Report and Written Opinion dated Dec. 4, 2024 for Application No. PCT/US2024/043630.
M. Prabaharan, et al., "Stimuli-Responsive Chitosan-graft-Poly(N-vinylcaprolactam) as a Promising Material for Controlled Hydrophobic Drug Delivery," Macromolecular Bioscience, (2008), 8(9):843-51.
E. Tarabukina, et al., "Synthesis, Structure, Hydrodynamics and Thermoresponsiveness of Graft Copolymer with Aromatic Polyester Backbone at Poly(2-isopropyl-2-oxazoline) Side Chains," Polymers, (2020), 12(11), 2643.
Xin, et al., Sains Malaysiana 45(10), (2016): 1543-1550.
Gangadhar Panambu, et al., "Designing Temperature and pH Sensitive NIPAM Based Polymers," Millipore Sigma, {no year cited}.

* cited by examiner

*Primary Examiner* — Silvana C Runyan
(74) *Attorney, Agent, or Firm* — Patterson + Sheridan, LLP

(57) ABSTRACT

Embodiments of the present disclosure generally relate to epoxy resin compositions and uses thereof. In some embodiments, a method includes providing an emulsion to a wellbore. The emulsion comprises an epoxy resin, a curing agent, water, and a block copolymer surfactant. The method includes de-emulsifying the emulsion in the wellbore to form a water phase and an epoxy phase and applying the epoxy phase to a wellbore component. The method includes curing the epoxy phase in the aperture after de-emulsifying the emulsion.

20 Claims, 1 Drawing Sheet

EPOXY RESIN COMPOSITIONS AND DOWNHOLE USES THEREOF

CROSS-REFERENCE TO RELATED APPLICATIONS

This application claims benefit to U.S. Prov. Appl. No. 63/536,205, filed on Sep. 1, 2023, which is herein incorporated by reference in its entirety.

FIELD

Embodiments of the present disclosure generally relate to epoxy resin compositions and uses thereof.

BACKGROUND

Many industrial processes form apertures in subterranean regions that may need filling, sealing, or other stabilization. For example, in the oil and gas industry, unstable subterranean zones or formations can be filled with cementitious material. After the cementitious material has set, the wellbore has been drilled through the cementitious material leaving a cementitious sheath in the wellbore for preventing undesired fluid influx and fluid losses. Alternatively, a cement slurry may be pumped down the inside of a pipe or casing and back up the outside of the pipe or casing through the annular space, sealing the subterranean zones in the formation and supporting the casing. Because conventional cementing slurries set quickly, the slurries cannot be made long in advance of their use. As such, subterranean apertures or unstable regions cannot be filled or stabilized all at once, adding considerable cost and time delays to the stabilization process. The existence of such apertures results in loss of drilling fluid circulation which then involves termination of the drilling and the implementation of remedial procedures which are often of long duration and high cost. Further, the cement slurries have very high viscosities and as such typically are only capable of partially filling an aperture, and are thus not useful for stabilization of incompetent or otherwise unstable subterranean zones.

In addition, the cement deposited in general, and in or near apertures in particular, is subjected to a number of stresses during use. For example, the pressure inside a well casing can increase or decrease as the fluid filling it changes or as additional pressure is applied to the well. Temperature changes also create stress in the cement. Such stresses promote formation and propagation of apertures.

A number of attempts have been made to address remediation of apertures. For example, use of polymers, such as rubber latex or liquid polyester, independently or in addition to the cement have been proposed. However, such polymers are known to rapidly cure or else not cure until a wellbore depth having a temperature of greater than 100° C. is reached. As such, there are not currently polymers, or compositions thereof, capable of achieving filling, sealing, or other stabilization of apertures at shallower wellbore depths where the temperature is about 100° C. or lower, e.g., in the about 35° C. to about 100° C. range. In addition, if the kinetics of curing of a polymer are too slow to solidify in the apertures, the partially cured polymer can be encountered by pressurized fluids in the wellbore that dilute and wash away the partially cured polymer, providing an insufficient fill, seal, or other stabilization of apertures.

Therefore, there is a need for new and improved epoxy resin compositions and uses for epoxy resin compositions capable of achieving filling, sealing, or other stabilization of apertures at shallow wellbore depths.

SUMMARY

Embodiments of the present disclosure generally relate to epoxy resin compositions and uses thereof.

In some embodiments, a method includes providing an emulsion to a wellbore. The emulsion comprises an epoxy resin, a curing agent, water, and a block copolymer surfactant. The block copolymer surfactant has at least one hydrophilic block and at least one hydrophobic block. The method includes de-emulsifying the emulsion in the wellbore to form a water phase and an epoxy phase and applying the epoxy phase to a wellbore component. The method includes curing the epoxy phase in the aperture after de-emulsifying the emulsion. In some embodiments, a composition includes an epoxy resin, a curing agent, water, and a block copolymer surfactant. The block copolymer surfactant has at least one hydrophilic block and at least one hydrophobic block. The hydrophilic block comprises ethylene oxide units, isopropyl acrylamide units, hydroxylpropyl cellulose units, vinylcaprolactam units, 2-isopropyl-2-oxazoline units, vinylmethyl ether units, or combinations thereof. The hydrophobic block comprises propylene oxide units, epoxy units, or combinations thereof.

In some embodiments, a reaction product includes a composition of the present disclosure.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
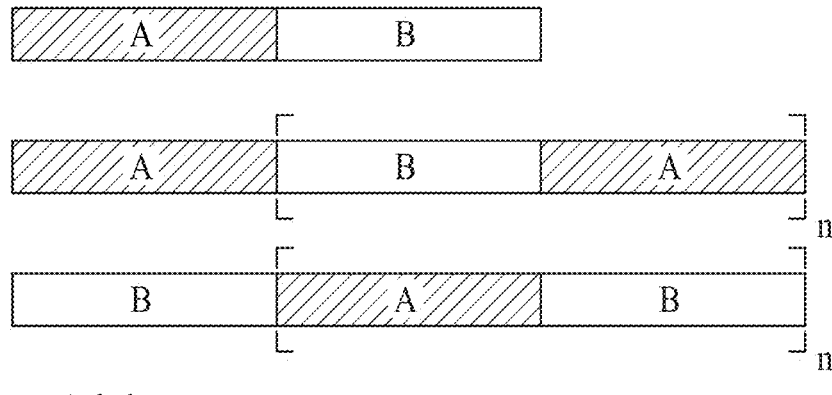
FIG. 1 is a schematic of types of block copolymers, according to an embodiment of the present disclosure.

Embodiments of the present disclosure generally relate to epoxy resin compositions and uses thereof. For example, new and improved epoxy resin compositions and uses for epoxy resin compositions have been discovered that are capable of achieving filling, sealing, or other stabilization of apertures at shallow wellbore depths. Additionally or alternatively, epoxy resin compositions can adhere downhole equipment to an interior surface of a wellbore or consolidate sand in the wellbore or in a fracture. As used herein, a "wellbore" refers to a hole that is drilled in the ground to aid in the exploration and recovery of natural resources, including oil, gas, or water. A wellbore herein can be encased by a material such as steel or cement, or a wellbore can be uncased.

The inventors have discovered that compositions having waterborne epoxies and surfactants of the present disclosure can de-emulsify at temperatures in a range from about 35° C. to about 100° C., such as about 50° C. to about 100° C. (a shallow wellbore depth) to separate the epoxy from water, apply the epoxy to an aperture, and selectively promote curing of the epoxy to provide filling, sealing, or other stabilization of apertures at shallow wellbore depths while the separated water phase can be absorbed into the environment, evaporated out, or simply remain in the wellbore and not affect cured epoxy properties. Because de-emulsification of such compositions is temperature dependent, instead of time dependent or pH dependent, the composition components can be mixed (as an emulsion) at the Earth's surface and pumped into the wellbore at the convenience of the operator without hurry. In addition, the temperature-selective de-emulsification can provide fast curing of the de-emulsified epoxy and curing agent, promoting aperture filling at selective shallow regions of the wellbore. Such temperature-dependent curing does not necessitate a secondary de-emulsification mechanism (such as pH or substantial additional additives such as high valency salts, acidic solutions, or large amounts of organic solvent), in addition to the temperature control, reduces or prevents unwanted wellbore plugging and can be limited to filling or sealing of apertures at shallow wellbore depths.

Cured compositions of the present disclosure can provide high mechanical strength, such as compared to waterborne resins that do not phase separate at lower temperatures and cured which otherwise provide bound water and significantly lower strength material (e.g., more sponge-like in nature as compared to glassy solid of a phase separated material that is cured).

In addition, due to low viscosity of a de-emulsified composition immediately before curing, the de-emulsified composition can effectively fill a greater proportion of the aperture, providing improved aperture fill for improved sealing/remediation of the wellbore. For example, an aperture can be filled with cured epoxy in an amount of about 75% or greater of the volume of the aperture, such as about 90% or greater, such as about 95% or greater.

In addition, waterborne epoxies in particular provide high bonding strength to adjacent cement of the aperture due to the presence of hydroxyl and ether moieties of the epoxies. Such characteristics can also provide interface bond strength between pipe walls and rock formation.

In addition, due to favorable curing kinetics provided by delayed curing due to emulsion followed by de-emulsification at low temperature, compositions of the present disclosure provide reduced or eliminated loss of drilling fluid after curing of the composition in an aperture of the wellbore.

The inventors have discovered that compositions (as emulsions) of the present disclosure can be designed such that the product is shelf stable at ambient or near ambient temperatures but promptly de-emulsifies when exposed to higher temperatures upon introduction to wellbore apertures in subterranean regions. Upon this temperature induced de-emulsification, the separated resin phase can be cured to stabilize said wellbore apertures with sufficient compressive strength. The temperature induced auto-demulsification property can be imparted upon the compositions by the careful selection of certain non-ionic amphiphilic block copolymers as the primary surfactant(s) of the emulsion compositions. A schematic of possible block copolymer configurations is presented in FIG. 1 according to some embodiments. In FIG. 1, A-blocks represent the water-soluble polymers, while the B-blocks represent the water insoluble polymers of the block copolymer surfactant. A and B blocks may be linear or branched, may be of low or high molecular weight and may repeat n-times (n=1, 2, 3, etc.) to yield higher molecular weight block copolymer surfactants.

As depicted, such surfactants can be composed of at least one hydrophilic block and at least one hydrophobic block such that the hydrophilic block(s) are selected from a family of so-called temperature responsive polymers (or "thermo-responsive polymers"). Whether a block is hydrophobic or hydrophilic can be determined using the partition coefficient of a block (independent of other structurally different blocks of the copolymer), namely the partition coefficient in water: octanol with values greater than 1 being hydrophobic and values less than 1 being hydrophilic. Thermoresponsive polymers are polymers that possess a property called a cloud point. Such thermoresponsive polymers (A) with cloud points may comprise the following monomeric units: ethylene oxide units, isopropyl acrylamide units, hydroxylpropyl cellulose units (such as hydroxypropyl methylcellulose units), vinylcaprolactam units, 2-isopropyl-2-oxazoline units, vinylmethyl ether units, or combinations thereof. The hydrophobic block (B) comprises propylene oxide units, epoxy units, or combinations thereof. The cloud point property of a polymer dictates its water solubility as a function of temperature. These temperature responsive polymers are water soluble at temperatures below their respective cloud points but dehydrate and become water insoluble at temperatures above their respective cloud points. When these temperature responsive polymers (A) are coupled to permanently water insoluble polymers (B), one thus obtains temperature responsive surfactants such that the surfactant stabilizes an emulsion at temperatures below the cloud point of the temperature responsive portion of the surfactant but not above its cloud point. Moreover, this cloud point can be tuned in the temperature range of about 35° C. to about 100° C. to match the de-emulsification temperature of the emulsion to specific temperatures encountered at shallow bore depths; hence, to meet the needs of specific wells. Tuning can be achieved by selecting an (A) copolymer with the appropriate cloud point or in the case of ethylene oxide-propylene oxide block copolymer surfactants by adjusting the mass fraction of (A) to (B) within the surfactant molecules. As a non-limiting example, for ethylene oxide-propylene oxide-ethylene oxide block copolymers (A-B-A with n=1 in FIG. 1) available under the trade name PLURONIC® from BASF, the cloud point gradually increases with increasing ethylene oxide fraction (A), exceeding 100° C. for A>0.8. Consequently, PLURONIC® L101 with A=0.1 has a cloud point of about 15° C., while PLURONIC® L64 with A=0.4 has a cloud point of about 58° C. and PLURONIC® F88 with A=0.8 has a cloud point of >100° C. for example.

Compositions

Compositions of the present disclosure include water, an epoxy (also referred to herein as an epoxy resin), a curing agent, and a surfactant. Compositions having water of the present disclosure can exist as an emulsion for de-emulsification downhole in a wellbore at elevated temperature. Surfactants of the present disclosure can provide a cloud point to the composition of about 35° C. to about 100° C. such that de-emulsification occurs at the cloud point. Compositions of the present disclosure can further include additional additives, such as a thickener, a stabilizer, or combinations thereof. As used herein, "cloud point" refers to the temperature below which a composition forms an emulsion or above which a composition undergoes a liquid-liquid phase separation ("de-emulsifies").

Compositions (as an emulsion) of the present disclosure can be formed using any suitable mixer by adding the components of the composition (e.g., epoxy, water, surfactant, and curing agent) and mixing the components using the mixer. In some embodiments, a surfactant(s) is charged to a mixer and heated at about 150° F. to about 165° F. A portion of water is then added to the mixer and mixed until surfactant is substantially or completely dissolved. The mixture formed in the mixer is then cooled to an inversion temperature (which varies by surfactant package, but in some embodiments is about 140° F. to about 150° F.). Epoxy resin (such as EPON™ Resin 828) is then added to the mixture in the mixer and mixed until a particle size target is achieved, then dilute to a desired % of non-volatiles with the remainder of water.

Compositions can be formulated with the following components, where the wt % of each component is based on % weight basis, and a total wt % of the resin composition not to exceed 100 wt %. It is also understood that compositions of the present disclosure can include additional components, such as sand or fillers.

(a) An amount of the epoxy resin in the resin composition can be from about 10 wt % to about 90 wt %, such as from about 30 wt % to about 70 wt %, such as from about 40 wt % to about 60 wt %, based on the combined weight of epoxy resin, surfactant, curing agent, and water. In at least one embodiment, the amount (wt %) of the epoxy resin in the resin composition is about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(b) An amount of curing agent in the resin composition can be from about 0.1 wt % to about 50 wt %, such as from about 1 wt % to about 25 wt %, such as from about 2 wt % to about 10 wt %, based on the combined weight of epoxy resin, surfactant, curing agent, and water. In at least one embodiment, the amount (wt %) of the curing agent in the resin composition is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(c) An amount of surfactant in the resin composition can be from about 1 wt % to about 40 wt %, such as from about 3 wt % to about 30 wt %, such as from about 6 wt % to about 20 wt %, based on the combined weight of epoxy resin, surfactant, curing agent, and water. In at least one embodiment, the amount (wt %) of the surfactant in the resin composition is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(d) An amount of water in the resin composition can be from about 1 wt % to about 99 wt %, such as from about 10 wt % to about 70 wt %, such as from about 30 wt % to about 60 wt %, alternatively about 1 wt % to about 5 wt %, alternatively about 5 wt % to about 10 wt %, alternatively about 10 wt % to about 20 wt %, based on the combined weight of epoxy resin, surfactant, curing agent, and water. In at least one embodiment, the amount (wt %) of the surfactant in the resin composition is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

Compositions can be formulated with the following components, where the wt % of each component is based on % weight basis, and a total wt % of the resin composition not to exceed 100 wt %:

(a) An amount of the epoxy resin in the resin composition can be from about 50 wt % to about 99 wt %, such as from about 60 wt % to about 95 wt %, such as from about 80 wt % to about 90 wt %, based on the combined weight of epoxy resin, surfactant, and curing agent but excluding water. In at least one embodiment, the amount (wt %) of the epoxy resin in the resin composition is about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(b) An amount of curing agent in the resin composition can be from about 0.1 wt % to about 50 wt %, such as from about 1 wt % to about 25 wt %, such as from about 2 wt % to about 10 wt %, based on the combined weight of epoxy resin, surfactant, and curing agent but excluding water. In at least one embodiment, the amount (wt %) of the curing agent in the resin composition is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

(c) An amount of surfactant in the resin composition can be from about 1 wt % to about 40 wt %, such as from about 3 wt % to about 30 wt %, such as from about 6 wt % to about 20 wt %, based on the combined weight of epoxy resin, surfactant, and curing agent but excluding water. In at least one embodiment, the amount (wt %) of the surfactant in the resin composition is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or 67, or ranges thereof, though higher or lower amounts are contemplated. Each of the foregoing numbers can be preceded by the word "about," "at least about," "less than about," or "more than about," and any of the foregoing numbers can be used singly to describe an open-ended range or in combination to describe a close-ended range.

In some embodiments, the amount of the epoxy resin and the amount of the curing agent can be varied. For such embodiments, a molar ratio of the epoxy resin to the curing agent is from about 2:1 to about 1:2, such as from about 6:4 to about 4:6, such as from about 1:1. In some embodiments of the composition, the molar ratio of the epoxy resin to the curing agent is from about 4:1, 7:3, 69:31, 68:32, 2:1, 66:34, 65:35, 64:36, 63:37, 62:38, 61:39, 60:40, 59:41, 58:42, 57:43, 56:44, 55:45, 54:46, 53:47, 52:48, 51:49, 50:50, 49:51, 48:52, 47:53, 46:54, 45:55, 44:56, 43:57, 42:58, 41:59, 4:6, or 1:2, or ranges thereof, though higher or lower molar ratios are contemplated. Each of the foregoing numbers can be preceded by the word "about," "at least about," "less than about," or "more than about," and any of the foregoing numbers can be used singly to describe an open-ended range or in combination to describe a close-ended range.

The molar ratio of the epoxy resin to the curing agent is based on functional equivalence (reactive groups present in each component). That is, the molar ratio refers to the molar quantities of (epoxy group):(active hydrogens located on the groups (e.g., amine groups) of the curing agent).

In some embodiments, the amount of the epoxy resin and the amount of the surfactant can be varied. For such embodiments, a weight ratio of the epoxy resin to the surfactant is from about 1:1 to about 99.5:0.5, such as from about 4:1 to about 99:1, such as from about 85:15 to about 98:2. In some embodiments of the composition, the weight ratio of the epoxy resin to the curing agent is from about 1:1, 99.5:0.05, 99:1, 98:2, 85:15, 4:1, or 1:1, or ranges thereof, though higher or lower weight ratios are contemplated. Each of the foregoing numbers can be preceded by the word "about," "at least about," "less than about," or "more than about," and any of the foregoing numbers can be used singly to describe an open-ended range or in combination to describe a close-ended range. The weight ratio of the epoxy resin to the surfactant is based on weight equivalence of the compounds themselves. In some embodiments, a weight ratio of epoxy resin to surfactant is dictated by a balance between the desired structural integrity of the cured resin (for example, less surfactant can be better) and the desired shelf-stability of the waterborne epoxy resin (for example, more surfactant is better).

Compositions of the present disclosure can have a shelf-life @ about 25° C. of greater than 3 months, such as greater than 6 months, such as greater than 1 year, such as about greater than 1.5 years. Shelf-life refers to a composition's ability to maintain emulsion. An emulsion is a dispersion of droplets of one liquid phase in another liquid phase in which the phases are not substantially soluble or miscible with one another.

Compositions of the present disclosure can de-emulsify at a temperature (cloud point) of about 35° C. to about 100° C., such as about 50° C. to about 100° C. during use, such as about 60° C. to about 100° C., such as about 70° C. to about 100° C., such as about 80° C. to about 100° C., such as about 90° C. to about 100° C., alternatively about 80° C. to about 95° C., such as about 90° C. to about 95° C.

Compositions of the present disclosure can de-emulsify (at a cloud point) from a substantial emulsion to a substantial non-emulsion (e.g., separate into water phase and an epoxy phase) in a time period of about 2 hours or less, such as about 1 hour less, such as about 15 minutes to about 1 hour, such as about 30 minutes to about 1 hour. Moreover, the de-emulsification temperature can be carefully engineered to meet the requirements of a particular well by designing or employing surfactants with appropriate cloud points.

Surfactants

Surfactants of the present disclosure are block copolymers having at least one hydrophilic block and at least one hydrophobic block. In contrast to random copolymers or alternating copolymers, block copolymers having at least one hydrophilic block and at least one hydrophobic block provide tunability of temperature responsive surfactant behavior.

In some embodiments, the hydrophilic block includes ethylene oxide units, isopropyl acrylamide units, hydroxylpropyl cellulose units, vinylcaprolactam units, 2-isopropyl-2-oxazoline units, vinylmethyl ether units, or combinations thereof.

In some embodiments, the hydrophobic block includes propylene oxide units, epoxy units, or combinations thereof.

For example, it has been discovered that a surfactant that is an ethylene oxide-propylene oxide block copolymer having a weight average molecular weight ($M_w$) of about 1,000 g/mol to about 9,000 g/mol, such as about 1,500 g/mol to about 9,000 g/mol, such as about 4,000 g/mol to about 8,000 g/mol, such as about 5,000 g/mol to about 7,500 g/mol, such as about 6,500 g/mol to about 7,500 g/mol, and a molar ratio of ethylene oxide units to propylene oxide units of about 0.25 to about 1.5, such as about 0.7 to about 1.3, such as about 0.8 to about 1.2, can provide a de-emulsification of a composition of the present disclosure at a temperature of about 85° C. to about 95° C., such as about 90° C.

In some embodiments, an ethylene-oxide propylene-oxide copolymer is a modified polyethylene oxide-polypropylene oxide (PEO-PPO) block copolymer surfactant, a mixture of modified and unmodified polyethylene oxide-polypropylene oxide copolymer surfactants, or a plurality of unmodified polyethylene oxide-polypropylene oxide copolymer surfactants. Non-exclusive examples of suitable polyethylene oxide-polypropylene oxide copolymers include PLURONIC® PE10500 (a polyethylene oxide-polypropylene oxide copolymer), PLURONIC® P103 and PLURONIC® F77 (ethylene oxide/propylene oxide block copolymers), and PLURONIC® L101 (an ethylene oxide/propylene oxide block copolymer), all of which are available from BASF.

In addition, modified surfactants such as condensation products of polyalkylene glycols with polyglycidyl ethers of bis-phenol A may be used to emulsify the epoxy film former and form the epoxy resin emulsion. Suitable polyalkylene glycols include compounds such as copolymers of ethylene oxide and propylene oxide, polyethylene glycols, polypropylene glycols, polybutylene glycols, and monoalkyl ether derivatives thereof. Alkylphenol polyethyoxylates may also be used as a surfactant. Illustrative examples of suitable surfactants for use in the composition include IGEPAL® CO 897 and IGEPAL® CO 210, nonylphenolpolyethoxyethanols available from Stepan, and TRITON® X-100, an octylphenoxypolyethoxyethanol available from Dow Chemicals.

In some embodiments, ethylene oxide propylene oxide copolymers are selected from the group consisting of ethylene oxide propylene oxide block copolymers, ethylene oxide propylene oxide alkoxylates, and ethylene oxide propylene oxide reverse copolymers.

In some embodiments, the surfactant is an ethylene oxide-propylene oxide block copolymer represented by Formula (I):

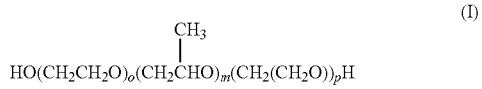

where each of "o," "m," and "p" is independently from about 1 to about 50, such that the surfactant has a weight average molecular weight ($M_w$) of about 1,000 g/mol to about 9,000 g/mol, such as about 1,500 g/mol to about 9,000 g/mol, such as about 4,000 g/mol to about 8,000 g/mol, such as about 5,000 g/mol to about 7,500 g/mol, such as about 6,500 g/mol to about 7,500 g/mol, and a molar ratio of ethylene oxide units to propylene oxide units of about 0.25 to about 1.5, such as about 0.7 to about 1.3, such as about 0.8 to about 1.2.

In alternative embodiments, the surfactant is the product sold under the trade name ANTAROX® L-64 (Rhodia Inc., Cranbury, N.J.).

In some embodiments, the surfactant is an ethylene oxide-propylene oxide reverse copolymer surfactant represented by Formula (II):

where each of "m" and "n" is independently from about 10 to about 60 such that the surfactant has a weight average molecular weight ($M_w$) of about 1,000 g/mol to about 9,000 g/mol, such as about 1,500 g/mol to about 9,000 g/mol, such as about 4,000 g/mol to about 8,000 g/mol, such as about 5,000 g/mol to about 7,500 g/mol, such as about 6,500 g/mol to about 7,500 g/mol, and a molar ratio of ethylene oxide units to propylene oxide units of about 0.25 to about 1.5, such as about 0.7 to about 1.3, such as about 0.8 to about 1.2.

In an alternative embodiment, the surfactant is the product sold under the trade name ANTAROX® 31R1 (Rhodia Inc., Cranbury, N.J.).

In some embodiments, the surfactant is an ethylene oxide-propylene oxide alkoxylate represented by Formula (III):

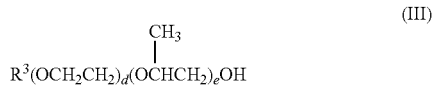

where each of "d" and "e" is independently from about 1 to about 50 such that the surfactant has a weight average molecular weight (Mw) of about 1,000 g/mol to about 9,000 g/mol, such as about 1,500 g/mol to about 9,000 g/mol, such as about 4,000 g/mol to about 8,000 g/mol, such as about 5,000 g/mol to about 7,500 g/mol, such as about 6,500 g/mol to about 7,500 g/mol, and a molar ratio of ethylene oxide units to propylene oxide units of about 0.25 to about 1.5, such as about 0.7 to about 1.3, such as about 0.8 to about 1.2; $R^3$ is a hydrocarbon chain containing about 1 to about 22 carbon atoms and may be branched or straight-chained and saturated or unsaturated.

In an alternative embodiment, the surfactant is the product sold under the trade name ANTAROX® BL-14 (Rhodia Inc., Cranbury, N.J.).

Thermoresponsive Polymers

In addition, a block formed from isopropylacrylamide units (to form a polyisopropylacrylamide block) can provide a de-emulsification of a composition of the present disclosure at a temperature (cloud point) of about 30° C. to about 40° C., such as about 32° C. Accordingly, in combination with other copolymer blocks of the present disclosure, de-emulsification of a composition can occur at a controllable temperature (e.g., less than 100° C.). Polyisopropylacrylamide can be obtained commercially from Shaanxi Dideu Medichem Co. Ltd.

In addition, a block formed from hydroxypropyl methylcellulose units (to form a polyhydroxypropyl methylcellulose) can provide a de-emulsification of a composition of the present disclosure at a temperature (cloud point) of about 48° C. to about 70° C., such as about 55° C. Accordingly, in combination with other copolymer blocks of the present disclosure, de-emulsification of a composition can occur at a controllable temperature (e.g., less than 100° C.). Hydroxypropyl methylcellulose can be obtained commercially from DuPont under the METHOCEL® trade name.

In addition, a polyvinylcaprolactam block can provide a de-emulsification of a composition of the present disclosure at a temperature (cloud point) of about 30° C. to about 40° C., such as about 35° C. Accordingly, in combination with other copolymer blocks of the present disclosure, de-emulsification of a composition can occur at a controllable temperature (e.g., less than 100° C.). Polyvinylcaprolactam can be obtained commercially from BASF under the LUVISKOL® Plus trade name.

In addition, a poly-2-isopropyl-2-oxazoline block can provide a de-emulsification of a composition of the present disclosure at a temperature (cloud point) of about 60° C. to about 70° C., such as about 65° C. Accordingly, in combination with other copolymer blocks of the present disclosure, de-emulsification of a composition can occur at a controllable temperature (e.g., less than 100° C.). Poly-2-isopropyl-2-oxazoline can be synthesized through cationic ring-opening polymerization (CROP), for example with the use of acetonitrile as solvent and Cadmium Acetate as reaction catalyst. Example monomer:catalyst ratio is about 100:1 with reaction being carried out at about 75° C.

In addition, a polyvinylmethyl ether block can provide a de-emulsification of a composition of the present disclosure at a temperature (cloud point) of about 21° C. to about 30° C., such as about 28° C. Accordingly, in combination with other copolymer blocks of the present disclosure, de-emulsification of a composition can occur at a controllable temperature (e.g., less than 100° C.). Polyvinylmethyl ether can be obtained commercially from BASF under the trade name LUTONAL® M 40.

Example Methods of Forming Block Copolymers

Polyisopropylacrylamide (PNIPAM) as thermoresponsive polymer block(s): Free radical polymerization of isopropylacrylamide (NIPAM) with 2-aminoethanethiolhydrochloride can be performed as chain transfer agent and post-polymerization treatment to yield amine-functional polyNIPAM (PNIPAM) which can then react with appropriate epoxy resin (such as EPON™ Resin 1001F) as hydrophobe. General conditions can be that of standard solvent borne free radical polymerizations, such as any suitable solvent and likely peroxide initiator that is heated sufficiently to initiate polymerization. See, for example, Scheme 1 below: Gangadhar Panambu, et al., "Designing Temperature and pH Sensitive NIPAM Based Polymers," Millipore Sigma, incorporated by reference herein.

Scheme 1

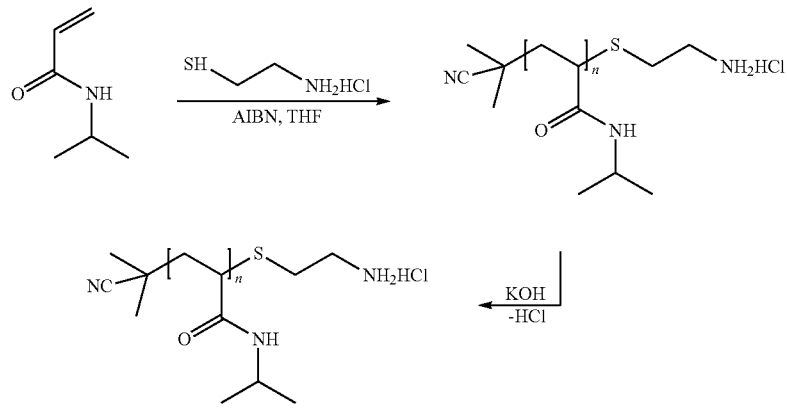

Hydroxypropylcellulose (HPC) as thermoresponsive polymer block(s): Use commercially available Klucel™ HPC as-is.

Polyvinylcaprolactam (PNVCL) as thermoresponsive polymer block(s): Free radical polymerization of vinylcaprolactam with 3-mercaptopropionic acid can be performed, the product of which can then be reacted with appropriate epoxy resin (such as EPON™ Resin 1001F). See, for example, Scheme 2 below: M. Prabaharan, et al., "Stimuli-Responsive Chitosan-graft-Poly(N-vinylcaprolactam) as a Promising Material for Controlled Hydrophobic Drug Delivery," Macromolecular Bioscience, (2008), 8(9): 843-51, incorporated by reference herein.

Scheme 2

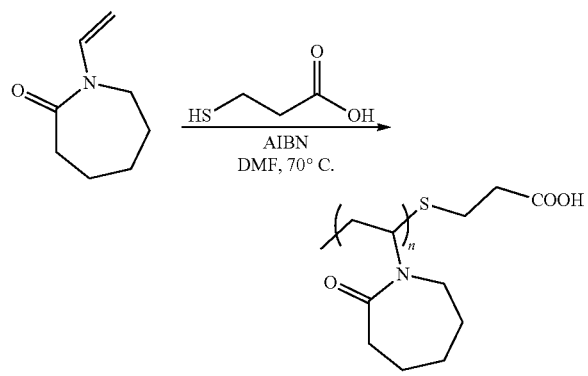

Polyvinylmethylether (PVME) as thermoresponsive polymer block(s): Free radical polymerization of vinylmethylether with 2-aminoethanethiolhydrochloride as chain transfer agent can be performed and post-polymerization treatment to yield amine-functional PVME. PVME can then react with appropriate epoxy resin (such as EPON™ Resin 1001F) as hydrophobe.

Poly-2-isopropyl-2-oxazoline (PIPROX) as thermoresponsive polymer block(s): Condensation reaction of EPON™ Resin 828 and Bisphenol A (excess BPA) can be performed using any suitable catalyst such as triphenylphosphine (TPP) and heating followed by reaction with excess epichlorohydrin (ECH) leaving terminal halide groups, then react with 2-isopropyl-2-oxazoline followed by cationic polymerization with additional 2-isopropyl-2-oxazoline to achieve desired Mw, HLB, etc. See, for example, E. Tarabukina, et al., "Synthesis, Structure, Hydrodynamics and Thermoresponsiveness of Graft Copolymer with Aromatic Polyester Backbone at Poly(2-isopropyl-2-oxazoline) Side Chains," Polymers, (2020), 12(11), 2643, incorporated by reference herein.

Epoxy Resins

Epoxy resins of the present disclosure are "waterborne" epoxy resins, meaning that compositions of the present disclosure before de-emulsification have water. The presence of water (in combination with surfactants of the present disclosure) provides reduction or elimination of organic solvents in compositions (and cured compositions thereof) which provides improved and more consistent physical properties of cured compositions. For example, reduction or elimination of organic solvents of compositions of the present disclosure provides reduced or eliminated amounts of volatile organic compounds (VOCs) that are otherwise emitted into the environment at the elevated temperatures experienced downhole in a wellbore. In addition, the waterborne epoxy resins have much improved handling and pumpability characteristics compared to bulk epoxy resin.

In some embodiments, the epoxy resin has a weight average molecular weight (Mw) of about 340 g/mol to about 470 g/mol and an epoxy equivalent weight of about 170 g/mol to about 235 g/mol, such as an Mw of about 360 g/mol to about 390 g/mol and an epoxy equivalent weight of about 180 g/mol to about 195 g/mol, such as an Mw of about 360 g/mol to about 384 g/mol and an epoxy equivalent weight of about 185 g/mol to about 192 g/mol. "Epoxy equivalent weight", as used herein, refers to the molecular weight of the epoxy resin divided by the number of epoxy groups present in the compound. Some example epoxy resins contain at least one epoxy group in the molecule, such as polyglycidyl ethers of polyhydric alcohols or thiols. Examples of suitable epoxy resins include a bis-phenol A diglycidyl ether epoxy resins such as EPON® 828 (available from Westlake Epoxy), DER 331 (available from Dow Chemicals), Araldite 6010 (available from Huntsman), and Epotuf 37-140 (available from Reichhold Chemical Co).

Epoxy resins of the present disclosure are those compounds containing at least one vicinal epoxy group. The epoxy resin may be saturated or unsaturated, aliphatic, cycloaliphatic, aromatic or heterocyclic and may be substituted.

The epoxy resin utilized may be, for example, an epoxy resin or a combination of epoxy resins prepared from an epihalohydrin and a phenol or a phenol type compound, prepared from an epihalohydrin and an amine, prepared from an epihalohydrin and a carboxylic acid, or prepared from the oxidation of unsaturated compounds (e.g., direct epoxidation route via peroxide).

Suitable epoxy resins can include non-aromatic epoxy resins. The epoxy resins can contain more than one and in some embodiments, two 1,2-epoxy groups per molecule. In some embodiments, the epoxy resin may be liquid at ambient temperature (in contrast to downhole temperatures) rather than solid. In at least one embodiment, the epoxy resin has an epoxide equivalent weight of about 100 to about 5,000, such as from about 100 to about 2,000, such as from about 100 to about 500, as determined by titration methods described in ASTM D1652.

In some embodiments, the epoxy resins may be non-aromatic hydrogenated cyclohexane dimethanol and diglycidyl ethers of hydrogenated Bisphenol A-type epoxy resin, such as hydrogenated bisphenol A-epichlorohydrin epoxy resin, cyclohexane dimethanol diglycidylether, and cycloaliphatic epoxy resin.

In at least one embodiment, the epoxy resins utilized in the resin compositions of the present disclosure include those resins produced from an epihalohydrin and a phenol or a phenol-type compound. The phenol-type compound includes compounds having an average of more than one aromatic hydroxyl group per molecule. Examples of phenol-type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (the reaction product of phenols and simple aldehydes, such as formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

In some embodiments, the epoxy resin utilized in the compositions described herein include those resins produced from an epihalohydrin and bisphenols, halogenated bisphenols, hydrogenated bisphenols, novolac resins, and polyalkylene glycols, or combinations thereof.

In at least one embodiment, the epoxy resin compounds utilized in the compositions of the disclosure can include those resins produced from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or combinations thereof.

In some embodiments, the epoxy resins utilized in the compositions of the present disclosure include those resins produced from an epihalohydrin and an amine. Suitable amines include diaminodiphenylmethane, aminophenol, xylene diamine, anilines, and the like, or combinations thereof.

In at least one embodiment, the epoxy resin utilized in the compositions of the disclosure can include those resins produced from an epihalohydrin and a carboxylic acid. Suitable carboxylic acids include phthalic acid, isophthalic acid, terephthalic acid, tetrahydrohydrophthalic acid, hexahydrophthalic acid, endomethylenetetrahydrophthalic acid, isophthalic acid, methylhexahydrophthalic acid, and the like or combinations thereof.

In some embodiments, the epoxy resin compounds utilized in the compositions of the disclosure include those resins produced from an epihalohydrin and compounds having at least one aliphatic hydroxyl group. In such embodiments, it is understood that such resin compositions produced contain an average of more than one aliphatic hydroxyl groups. Examples of compounds having at least one aliphatic hydroxyl group per molecule include aliphatic alcohols, aliphatic diols, polyether diols, polyether triols, polyether tetrols, any combination thereof and the like. Also suitable are the alkylene oxide adducts of compounds containing at least one aromatic hydroxyl group. In such embodiments, it is understood that such resin compositions produced contain an average of more than one aromatic hydroxyl groups. Examples of oxide adducts of compounds containing at least one aromatic hydroxyl group per molecule include ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or combinations thereof.

The epoxy resin, in some embodiments, can refer to an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon. A carboxyl substituted hydrocarbon is described herein as a compound having a hydrocarbon backbone, such as a $C_1$-$C_{40}$ hydrocarbon backbone, and one or more carboxyl moieties, such as more than one, such as two. The $C_1$-$C_{40}$ hydrocarbon backbone may be a linear- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, pivalic acid, neodecanoic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, salts thereof, dimers thereof, or any combination thereof.

In at least one embodiment, the epoxy resin is a reaction product of a polyepoxide and a compound containing more than one isocyanate moiety or a polyisocyanate. The epoxy resin produced in such a reaction can be an epoxy-terminated polyoxazolidone.

In some embodiments, the epoxy resin includes cyclohexanol, 4,4'-(1-methylethylidene)bis-, polymer with 2-(chloromethyl)oxirane (CAS Number 30583-72-3).

Curing Agents

Compositions of the present disclosure have one or more curing agents. Curing agents useful with compositions described herein include a primary amine, a second amine, a tertiary amine, aliphatic polyamines, cycloaliphatic amines, aromatic amines (such as imidazoles), anhydrides, mercaptans, isocyanates, Mannich bases, ketimines, oxazolines, amidoamines, and modified polyamine resins prepared by reacting aliphatic or cycloaliphatic polyamines with compounds containing functional groups which react with the amine group, such as glycidyl ether-containing or carboxy-containing compounds. Reaction products of polyamines with glycidyl ether-group containing compounds are known as "polyamine-epoxy adducts." Reaction products of dicarboxylic acids and polyamines are known as "polyamide resins." The latter are usually prepared by condensation of the dicarboxylic acid with excess amounts of polyalkylene polyamines. Polyamides based on dicarboxylic acids having more than 10 carbon atoms, particularly those based on $C_{36}$ dicarboxylic acids, may be preferred because of the water resistance and flexibility of the resulting cured composition. Examples of suitable polyamines useful with the method of the application include 1,3-bis(aminomethyl)cyclohexane, diethylenetriamine, triethylenetetramine, hexamethylenediamine, trimethylhexamethylenediamine, tetraethylenepentaamine, N,N'-dimethylpropylenediamine, 1,3-bis(4-amino-3-methylcyclohexyl) methane, bis(p-aminocyclohexyl)methane, 2,2-bis(4-aminocyclohexyl)propane, 3,5,5-trimethyl-3-(aminomethyl)-cyclohexylamine, N-aminoethlpiperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,4-bis(aminomethyl)cyclohexane, and combinations thereof.

In some embodiments, the curing agent includes a polyamine of formula (IVa):

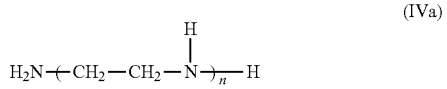

(IVa)

wherein:
n of formula (IVa) is 1, 2, 3, 4, 5, or 6.

Illustrative, but non-limiting examples, of the polyamine of formula (IVa) include diethylene triamine, ethylene diamine, triethylene diamine, hydrazine, or combinations thereof.

In some embodiments, the curing agent can include polyetheramine compounds. Polyetheramine compounds have several general formulas. One such formula is:

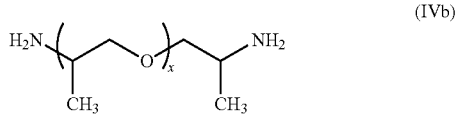

(IVb)

wherein:
x of formula (IVb) is from about 2 to about 68, such as from about 2.5 to about 6.1.

Another general formula for polyetheramine compounds is formula (IVc):

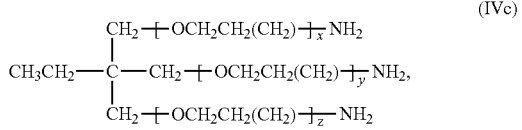

(IVc)

wherein:
x+y+z of formula (IVc) is an integer ranging from about 5 to about 85, such as from about 15 to about 60, such as from about 20 to about 40.

Other general formulas for polyetheramine compounds include formula (IVd):

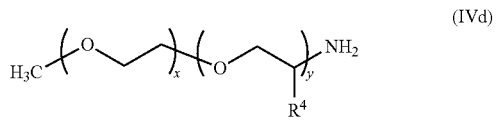

(IVd)

wherein:
$R^4$ of formula (IVd) is a hydrogen atom (H) for ethylene oxide (EO) and $R^4$ is $CH_3$ for propylene oxide (PO);
x of formula (IVd) is from about 1 to about 40; and
y of formula (IVd) is from about 1 to about 40.

In some examples of formula (IVd), x=1 when y=9, x=19 when y=3, or x=6 when y=29-35. Other combinations are contemplated. The propylene oxide to ethylene oxide ratio for formula (IVd) may be from about 9:1 to about 10:31, such as about 9:1, about 3:19, about 29:6, or about 10:31.

Other general formulas for polyetheramine compounds include formula (IVe):

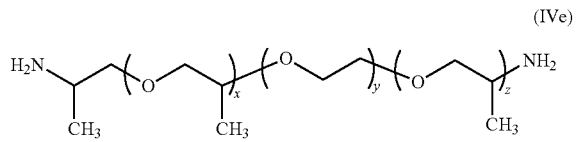

(IVe)

wherein:
x+z of formula (IVe) is from about 1.2 to about 6; and
y of formula (IVe) is from about 2 to about 39.

Examples of suitable polyamines useful with compositions described herein include 1,3-bis(aminomethyl)cyclohexane, diethylene triamine, triethylenetetraamine, hexamethylenediamine, trimethylhexamethylene diamine, tetraethylene pentaamine, N,N'-dimethylpropylenediamine, 1,3-bis(4-amino-3-methylcyclohexyl)methane, bis(p-aminocyclohexyl) methane, 2,2-bis(4-aminocyclohexyl)propane, 3,5,5-trimethyl-3-(aminomethyl)-cyclohexylamine, N-aminoethyl-piperazine, m-phenylenediamine, p-phenylenediamine, bis(p-aminophenyl)methane, bis(p-aminophenyl)sulfone, m-xylylenediamine, 1,2-diaminocyclohexane, 1,4-diaminocyclohexane, 1,4-bis(aminomethyl)cyclohexane, and combinations thereof.

Other suitable polyamines include any suitable amine functionalized polymer including, but not limited to, aminosilanes, amine-diacid adducts (industrially known as polyamidoamines), and amine-epoxy adducts.

Examples of suitable polyamines include the following polyetheramine compounds: polyoxypropylenediamine with a molecular weight of about 230 (x is 2.5 for formula (IVb)), polyoxypropylenediamine with a molecular weight of about 430 (x is 6.1 for formula (IVb)), and combinations thereof.

The curing agent can include one or more of any of the aforementioned compounds, such as one or more polyamines. A weight average molecular weight (Mw) of the one or more polyamines suitable as a curing agent can be from about 15 g/mol to about 2,000 g/mol, such as from about 25 g/mol to about 1,000 g/mol, such as from about 35 g/mol to about 500 g/mol. In at least one embodiment, the Mw (g/mol) of the one or more polyamines is about 15, 25, 50, 100, 150, 200, 250, 300, 350, 400, 450, 500, 550, 600, 650, 700, 750, 800, 850, 900, 950, or 1,000, or ranges thereof, though higher or lower values are contemplated. Each of the foregoing numbers can be preceded by the word "about," "at least about," "less than about," or "more than about," and any of the foregoing numbers can be used singly to describe an open-ended range or in combination to describe a close-ended range. The Mw is determined as described in the Examples.

Besides the epoxy resin, the surfactant, water, and the curing agent, the compositions described herein can include other components. Such components include one or more solvents, one or more additives, or combinations thereof. Suitable solvents include an organic solvent. Organic solvents can include alcohols; aliphatic, naphthenic and aromatic hydrocarbons; ethers; esters; and ketones. Illustrative, but non-limiting, examples of organic solvents include hexane, heptane, octane, methyl cyclohexane, xylene, toluene, ethyl alcohol, isopropyl alcohol, butyl alcohol, the monomethyl ether of diethylene glycol, ethylene glycol of monobutyl ether, tetrahydrofuryl alcohol, ethylene glycol monomethyl ether, ethyl acetate, isopropyl acetate, butyl acetate, amyl acetate, acetone, methyl ethyl ketone, methyl isobutyl ketone, diisobutyl ketone, and combinations thereof. Other solvents are contemplated. In some embodiments, the resin composition is free or substantially free of water. In some embodiments, the organic solvent includes n-butanol, toluene, xylene, or mixtures thereof.

Suitable additives known in the art can be used with the resin compositions described herein. Such additives include sand; accelerators; fillers and extenders, such as silica, mica, quartz, cryolite, Portland cement, limestone, atomized alumina, barytes, talc, pyrophyllite, clay, diatomaceous earth, pigments, such as titanium dioxide, red lead, basic lead silica chromate, basic zinc chromate, zinc, zinc oxide, lead, barium chromate, strontium chromate, calcium plumbate, barium metaborate, calcium molybdate, strontium molybdate, and zinc molybdate; and resinous modifiers, such as phenolic resins, urea resins, melamine resins, acrylic resins, polyester resins, vinyl resins, bituminous resins, and polystyrene; surfactants; UV absorbers; and combinations thereof. Other additives are contemplated.

The amount of epoxy resin component or monomers used to form the epoxy resin component, curing agent, among other components (such as solvent) can be utilized to define the molecular structure, chemical properties, and physical properties of the cured composition.

Cured-Composition Properties

In some embodiments, a pre-cured composition of the present disclosure has viscosity (at about 23° C.) of about 200 cP to about 20,000 cP, such as about 200 cP to about 2,000 cP, as determined by ASTM D2196.

In some embodiments, the cured compositions described herein can have one or more of the following non-limiting properties:

In some embodiments, the cured compositions described herein can have a compressive strength of about 1,000 psi or greater, as determined by ASTM D3410.

End Uses

Compositions of the present disclosure can be used to fill distal or remote apertures of a wellbore, such as those located in shallow wellbore regions where temperatures achieve about 35° C. to about 100° C., such as about 50° C. to about 100° C. during use, such as about 60° C. to about 100° C., such as about 70° C. to about 100° C., such as about 80° C. to about 100° C., such as about 90° C. to about 100° C., alternatively about 80° C. to about 95° C., such as about 90° C. to about 95° C.

Methods of the present disclosure can include providing a composition including water, an epoxy, a surfactant, and a curing agent to a wellbore. The method can include de-emulsifying the composition at a temperature of about 35° C. to about 100° C., such as about 50° C. to about 100° C. (such as about 60° C. to about 100° C., such as about 70° C. to about 100° C., such as about 80° C. to about 100° C., such as about 90° C. to about 100° C., alternatively about 80° C. to about 95° C., such as about 90° C. to about 95° C.) to provide a first phase having the water and a second phase having the epoxy, the surfactant, and the curing agent. The method can include providing the second phase (also referred herein as the epoxy phase) to an aperture of the wellbore where it is applied to the aperture. The method can include curing the second phase to form a cured epoxy and seal the aperture.

Figure 2:
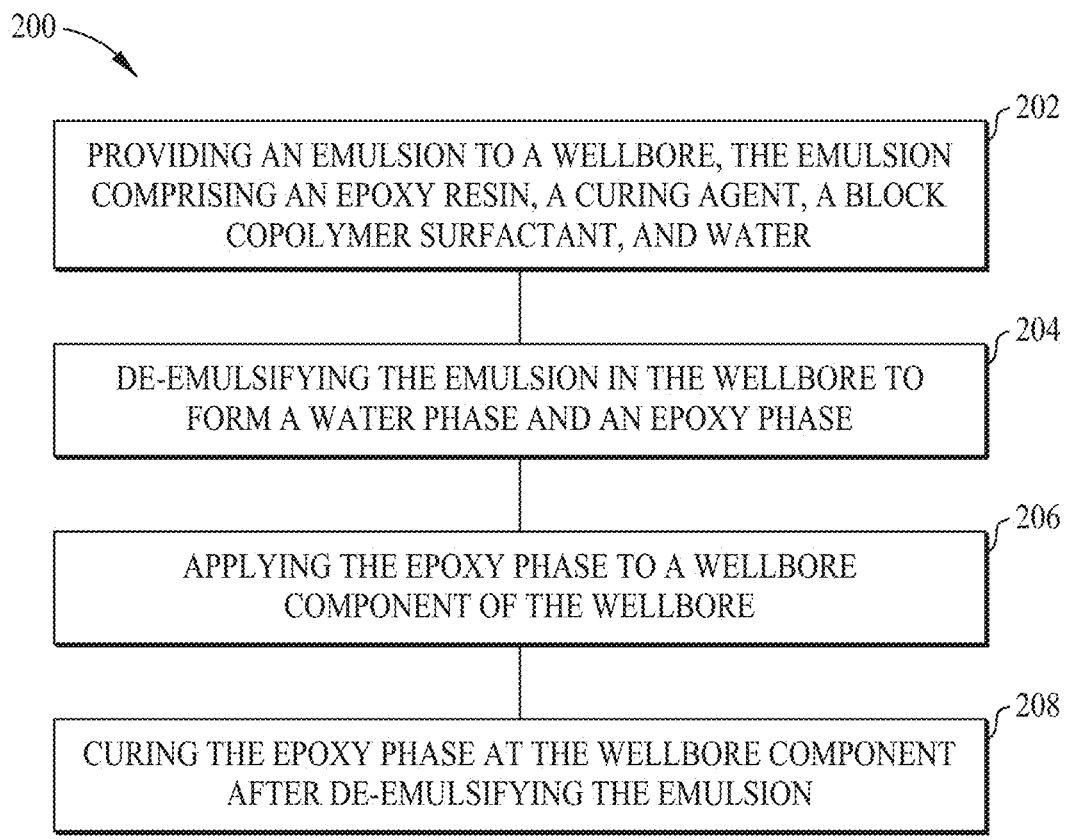
FIG. 2 is a process flow diagram illustrating a method, according to an embodiment of the present disclosure.

FIG. 2 is a process flow diagram illustrating a method 200, according to an embodiment of the present disclosure. The method 200 includes providing 202 an emulsion to a wellbore. The emulsion includes an epoxy resin, a curing agent, a block copolymer surfactant, and water. The method 200 further includes de-emulsifying 204 the emulsion in the wellbore to form a water phase and an epoxy phase. The method further includes applying 206 the epoxy phase to an aperture of the wellbore. The method further includes curing 208 the epoxy phase in the aperture after de-emulsifying the emulsion.

Any suitable apparatus and method for the delivery of the pre-cured composition to and through the wellbore may be utilized. As non-limiting examples, suitable delivery systems may utilize a dump bailer, coiled tubing and jointed tubing. Such delivery systems include a base to stack up against such as a packer, petal basket, or sand plug. While any suitable delivery mechanism can be utilized, more specific non-limiting examples of suitable delivery mechanisms include: dump bailer run on electric line or slick line; pumping through tubing, drill pipe, work strings, or any tubulars; allowing fall through fluids via gravity; and pumping into an annulas or pipe without displacing (such as, "bull heading").

In other various embodiments, systems configured for delivering a pre-cured composition of the present disclosure to a downhole location are described herein. In various embodiments, the systems can include a pump fluidly coupled to a tubular, the tubular containing a pre-cured composition of the present disclosure. The pump may be a high pressure pump in some embodiments. As used herein, the term "high pressure pump" can refer to a pump that is capable of delivering a fluid downhole at a pressure of about 1,000 psi or greater. A high pressure pump may be used when it is desired to introduce a composition of the present disclosure to a subterranean formation at or above a fracture gradient of the subterranean formation, but it may also be used in cases where fracturing is not desired. The composition described herein may be introduced with a high pressure pump or may be introduced following a treatment fluid that was introduced with a high pressure pump. In some embodiments, the high pressure pump may be capable of fluidly conveying a composition of the present disclosure through the wellbore to a location having a temperature of about 35° C. to about 100° C. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1,000 psi or less. In some embodiments, a low pressure pump may be fluidly coupled to a high pressure pump that is fluidly coupled to the tubular. That is, in such embodiments, the low pressure pump may be configured to convey the composition through the wellbore or to the high pressure pump. In such embodiments, the low pressure pump may "step up" the pressure of a treatment fluid before it reaches the high pressure pump. Alternately, the low pressure pump may be used to directly introduce the composition through the wellbore.

In some embodiments, the systems described herein can further include a mixing tank that is upstream of the pump and in which the pre-cured composition is formulated with water. In various embodiments, the pump (e.g., a low pressure pump, a high pressure pump, or a combination thereof) may convey the composition from the mixing tank or other source of the composition to the tubular of the wellbore. In other embodiments, however, the composition can be formulated offsite and transported to a worksite, in which case the composition may be introduced to the tubular via the pump directly from its shipping container (such as a truck, a railcar, a barge, or the like) or from a transport pipeline. In either case, the composition may be drawn into the pump, elevated to an appropriate pressure, and then introduced into the tubular for delivery downhole. Systems of the present disclosure can be a land-based system or sub-sea system.

Non-limiting additional components that may be present include, but are not limited to, supply hoppers, valves, condensers, adapters, joints, gauges, sensors, compressors, pressure controllers, pressure sensors, flow rate controllers, flow rate sensors, and/or temperature sensors.

It is also to be recognized that the compositions (e.g., cured compositions) of the present disclosure may directly or indirectly remediate the various downhole equipment and tools that may come into contact with the composition during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (such as shoes, collars, valves), logging tools and related telemetry equipment, actuators (such as electromechanical devices, hydromechanical devices), sliding sleeves, production sleeves, plugs, screens, filters, flow control devices (such as inflow control devices, autonomous inflow control devices, outflow control devices), couplings (such as electro-hydraulic wet connect, dry connect, inductive coupler), control lines (such as electrical, fiber optic, hydraulic), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Compositions and methods of the present disclosure may also be used to provide repair of buildings, foundations, roads, bridges, highways, sidewalks, tunnels, manholes, sewers, water treatment systems, reservoirs, canals, irrigation structures, mines, caves, wells, ditches, trenches, pits, cracks, fissures, craters, potholes, sinkholes, wallows, waterholes, among others.

The compositions described herein can alternatively be used as coatings, binders, paints, adhesives, sealants, among other applications. For example, the compositions can be used in construction, with installation of concrete and cement, such as high-gloss concrete installations. Another use includes coating metals. Other end-use applications for the compositions described herein include cellulosic, lignocellulosic, and wood products; plastics; fabrics (wovens and non-wovens); and glass. The compositions can be used generally for producing composites, adhesives, insulation materials, shaped products, binders, laminates, among other articles and articles of manufacture.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used but some experimental errors and deviations should be accounted for.

EXAMPLES

Test Methods

Demulsification tests were performed by placing a waterborne resin (by itself) in a 90° C. oven and observe visually how long it took for the resin to form a homogenous single phase system to a clearly separated system (clear resin layer on bottom, water layer on top).

| Resin | Time to Demulsify @ 90° C. | Shelf Life @ 25° C. |
|---|---|---|
| EPI-REZ ™ Resin 3511-W-65 | 30-60 min | >1 year |
| EPI-REZ ™ Resin 3510-W-60 | No demulsification | >1 year |
| EPI-REZ ™ Resin 7510-W-60 | No demulsification | >1 year |
| Waterborne dispersion made using EPI-REZ ™ Resin WD-510 | Sometimes demulsifies based on production method, but difficult to predict | Varies, but sometimes as short as 1 week |

| Resin used for Compressive Strength Formulation | Ultimate Compressive Strength (UCS)* |
|---|---|
| EPI-REZ ™ Resin 3511-W-65 | <100 psi (described as "squishy") |
| EPI-REZ ™ Resin 3510-W-60 | Not testable (poorly cured, crumbly sample) |
| EPI-REZ ™ Resin 7510-W-60 | Not testable (poorly cured, crumbly sample) |
| Epoxy Research Resin RSW-5003 | ≥1000 psi |
| Waterborne dispersion made using EPI-REZ ™ Resin WD-510 | ≥1000 psi |

*Results from Oil Chem Technologies using proprietary formulation of resin, curing agent, sand, and additional additives

EMBODIMENTS LISTING

The present disclosure provides, among others, the following aspects, each of which can be considered as optionally including any alternate embodiments:

Clause 1. A composition comprising:
- an epoxy resin;
- a curing agent;
- a block copolymer surfactant having at least one hydrophilic block and at least one hydrophobic block, wherein:
  - the hydrophilic block comprises ethylene oxide units, isopropyl acrylamide units, hydroxylpropyl cellulose units, vinylcaprolactam units, 2-isopropyl-2-oxazoline units, vinylmethyl ether units, or combinations thereof; and
  - the hydrophobic block comprises propylene oxide units, epoxy units, or combinations thereof.

Clause 2. An emulsion comprising water and the composition of Clause 1.

Clause 3. The composition of Clause 1 or 2, wherein the block copolymer surfactant is an ethylene oxide-propylene oxide copolymer having a molar ratio of ethylene oxide units to propylene oxide units of about 0.25 to about 1.5.

Clause 4. The composition of Clauses 1 to 3, wherein the block copolymer surfactant is an ethylene oxide-propylene oxide copolymer having a weight average molecular weight ($M_w$) of about 1,500 g/mol to about 8,000 g/mol.

Clause 5. The composition of any of Clauses 1 to 4, wherein the emulsion comprises:
- the epoxy resin in an amount of about 10 wt % to about 90 wt %;
- the curing agent in an amount of about 0.1 wt % to about 50 wt %;
- the block copolymer surfactant in an amount of about 1 wt % to about 40 wt %; and
- remainder balance being water, based on total wt % of the epoxy resin, the curing agent, the block copolymer surfactant, and the water, and the total wt % of the emulsion does not exceed 100 wt %.

Clause 6. The composition of any of Clauses 1 to 5, wherein the emulsion comprises the epoxy resin and the curing agent in a weight ratio of about 2:1 to about 1:2.

Clause 7. The composition of any of Clauses 1 to 6, wherein the emulsion comprises the epoxy resin and the block copolymer surfactant in a weight ratio of about 4:1 to about 40:60.

Clause 8. The composition of any of Clauses 1 to 7, wherein the block copolymer surfactant is an ethylene oxide-propylene oxide block copolymer represented by Formula (I):

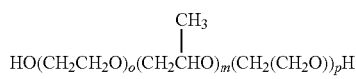

(I)

wherein each of o, m, and p is independently from about 1 to about 50, and the block copolymer surfactant of Formula (I) has a weight average molecular weight ($M_w$) of about 1,500 g/mol to about 8,000 g/mol and a molar ratio of ethylene oxide units to propylene oxide units of about 0.25 to about 1.5.

Clause 9. The composition of any of Clauses 1 to 8, wherein the block copolymer surfactant is an ethylene oxide-propylene oxide reverse copolymer surfactant represented by Formula (II):

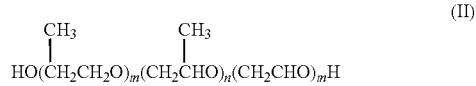

(II)

wherein each of m and n is independently from about 10 to about 60 and the block copolymer surfactant of Formula (II) has a weight average molecular weight ($M_w$) of about 1,500 g/mol to about 8,000 g/mol and a molar ratio of ethylene oxide units to propylene oxide units of about 0.25 to about 1.5.

Clause 10. The composition of any of Clauses 1 to 9, wherein the block copolymer surfactant is an ethylene oxide-propylene oxide alkoxylate represented by Formula (III):

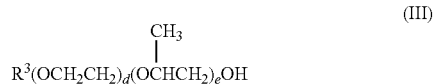

(III)

wherein each of d and e is independently from about 1 to about 50, $R^3$ is a hydrocarbon chain containing about 1 to about 22 carbon atoms, and the block copolymer surfactant of Formula (III) has a weight average molecular weight ($M_w$) of about 1,500 g/mol to about 8,000 g/mol and a molar ratio of ethylene oxide units to propylene oxide units of about 0.25 to about 1.5.

Clause 11. The composition of any of Clauses 1 to 10, wherein the epoxy resin has a weight average molecular weight (Mw) of about 340 g/mol to about 470 g/mol and an epoxy equivalent weight of about 170 g/mol to about 235 g/mol.

Clause 12. The composition of any of Clauses 1 to 11, wherein the curing agent is a polyamine represented by Formula (IVa):

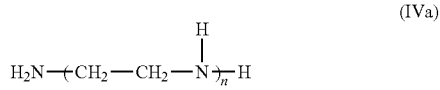

(IVa)

wherein:
n of formula (IVa) is 1, 2, 3, 4, 5, or 6.

Clause 13. The composition of any of Clauses 1 to 12, wherein the curing agent is a polyetheramine represented by Formula (IVb):

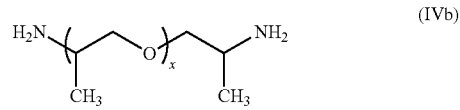

(IVb)

wherein:
x of formula (IVb) is about 2 to about 68.

Clause 14. The composition of any of Clauses 1 to 13, wherein the curing agent is a polyetheramine represented by Formula (IVc):

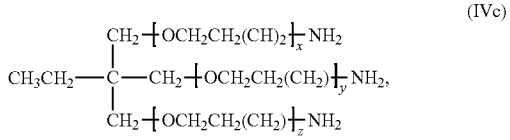

wherein:
    each of x, y, and z is independently 1 or greater; and
    x+y+z of formula (IVc) is about 5 to about 85.

Clause 15. The composition of any of Clauses 1 to 14, wherein the curing agent is a polyetheramine represented by Formula (IVd):

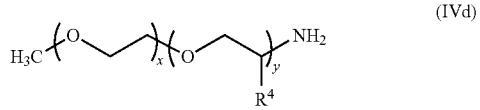

wherein:
    $R^4$ of formula (IVd) is a hydrogen atom (H) for ethylene oxide (EO) or $R^4$ is $CH_3$ for propylene oxide (PO);
    x of formula (IVd) is about 1 to about 40; and
    y of formula (IVd) is about 1 to about 40.

Clause 16. The composition of any of Clauses 1 to 15, wherein the curing agent is a polyetheramine represented by Formula (IVe):

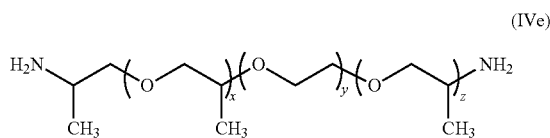

wherein:
    x+z of formula (IVe) is about 1.2 to about 6; and
    y of formula (IVe) is about 2 to about 39.

Clause 17. A reaction product of the composition of any of Clauses 1 to 16.

Clause 18. A method for using, producing, or making the reaction product or the composition of any of Clauses 1 to 17.

Clause 19. A method comprising:
    providing an emulsion to a wellbore, the emulsion comprising:
        an epoxy resin,
        a curing agent,
        a block copolymer surfactant having at least one hydrophilic block and at least one hydrophobic block; and
        water;
    de-emulsifying the emulsion in the wellbore providing a water phase and an epoxy phase;
    applying the epoxy phase to a wellbore component; and
    curing the epoxy phase at the wellbore component after de-emulsifying the emulsion.

Clause 20. The method of Clause 19, wherein the block copolymer surfactant comprises an ethylene oxide-propylene oxide copolymer having a molar ratio of ethylene oxide units to propylene oxide units of about 0.8 to about 1.2.

Clause 21. The method of Clause 19 or 20, wherein the wellbore component is selected from the group consisting of an aperture of the wellbore, equipment disposed within the wellbore, sand disposed within the wellbore, and combinations thereof.

Clause 22. The method of Clauses 19 to 21, wherein de-emulsifying the emulsion occurs in the wellbore at a temperature of about 35° C. to about 100° C.

Clause 23. The method of Clauses 19 to 22, wherein the emulsion comprises the epoxy resin and the curing agent in a molar ratio of about 2:1 to about 1:2.

Clause 24. The method of Clauses 19 to 23, wherein the emulsion comprises the epoxy resin and the block copolymer surfactant in a weight ratio of about 1:1 to about 99.5:0.5.

Clause 25. The method of Clauses 19 to 24, wherein the hydrophilic block is selected from the group consisting of ethylene oxide units, isopropyl acrylamide units, hydroxylpropyl cellulose units, vinylcaprolactam units, 2-isopropyl-2-oxazoline units, vinylmethyl ether units, and combinations thereof.

Clause 26. The method of Clause 19 to 25, wherein the hydrophobic block is selected from the group consisting of propylene oxide units, epoxy units, and combinations thereof.

Clause 27. The method of Clauses 19 to 26, wherein the hydrophobic block is selected from the group consisting of propylene oxide units.

Clause 28. The method of Clauses 19 to 27, wherein the block copolymer surfactant is a diblock copolymer comprising the hydrophilic block and the hydrophobic block.

Clause 29 The method of Clause 28, wherein the hydrophilic block is selected from the group consisting of ethylene oxide units, isopropyl acrylamide units, hydroxylpropyl cellulose units, vinylcaprolactam units, 2-isopropyl-2-oxazoline units, vinylmethyl ether units, and combinations thereof.

Clause 30. The method of Clauses 19 to 29, wherein the hydrophobic block is selected from the group consisting of propylene oxide units, epoxy units, and combinations thereof.

Clause 31. The method of Clauses 19 to 30, wherein the hydrophobic block is or comprises propylene oxide units.

Clause 32. The method of Clauses 19 to 31, wherein the block copolymer surfactant comprises a copolymer selected from the group consisting of Formula (I), Formula (II), Formula (III), and combinations thereof:

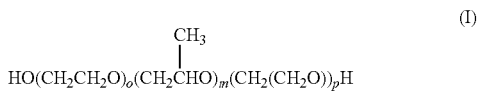

wherein each of o, m, and p of Formula (I) is independently about 1 to about 50 and the block copolymer surfactant of Formula (I) has a weight average molecular weight ($M_w$) of about 1,500 g/mol to about 8,000 g/mol and a molar ratio of ethylene oxide units to propylene oxide units of about 0.25 to about 1.5;

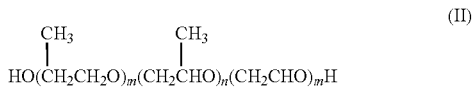

wherein each of m and n of Formula (II) is independently about 10 to about 60 and the block copolymer surfactant of Formula (II) has a weight average molecular weight ($M_w$) of about 1,500 g/mol to about 8,000 g/mol and a molar ratio of ethylene oxide units to propylene oxide units of about 0.25 to about 1.5;

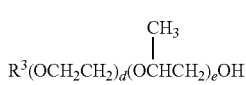

(III)

wherein each of d and e of Formula (III) is independently about 1 to about 50, $R^3$ of Formula (III) is a hydrocarbon chain containing about 1 to about 22 carbon atoms, and the block copolymer surfactant of Formula (III) has a weight average molecular weight ($M_w$) of about 1,500 g/mol to about 8,000 g/mol and a molar ratio of ethylene oxide units to propylene oxide units of about 0.25 to about 1.5.

Clause 33. The method of Clauses 19 to 32, wherein the block copolymer surfactant comprises an ethylene oxide-propylene oxide block copolymer represented by Formula (I):

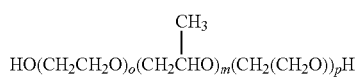

(I)

wherein each of o, m, and p is independently about 1 to about 50 and the block copolymer surfactant of Formula (I) has a weight average molecular weight ($M_w$) of about 1,500 g/mol to about 8,000 g/mol and a molar ratio of ethylene oxide units to propylene oxide units of about 0.25 to about 1.5.

Clause 34. The method of Clauses 19 to 33, wherein the block copolymer surfactant comprises an ethylene oxide-propylene oxide reverse copolymer surfactant represented by Formula (II):

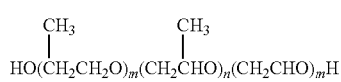

(II)

wherein each of m and n is independently about 10 to about 60 and the block copolymer surfactant of Formula (II) has a weight average molecular weight ($M_w$) of about 1,500 g/mol to about 8,000 g/mol and a molar ratio of ethylene oxide units to propylene oxide units of about 0.25 to about 1.5.

Clause 35. The method of Clauses 19 to 34, wherein the block copolymer surfactant comprises an ethylene oxide-propylene oxide alkoxylate represented by Formula (III):

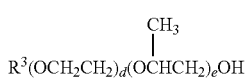

(III)

wherein each of d and e is independently about 1 to about 50, $R^3$ is a hydrocarbon chain containing about 1 to about 22 carbon atoms, and the block copolymer surfactant of Formula (III) has a weight average molecular weight ($M_w$) of about 1,500 g/mol to about 8,000 g/mol and a molar ratio of ethylene oxide units to propylene oxide units of about 0.25 to about 1.5.

Clause 36. The method of Clauses 19 to 35, wherein the curing agent is selected from the group consisting of:
a polyamine represented by Formula (IVa):

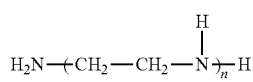

(IVa)

wherein:
n of formula (IVa) is 1, 2, 3, 4, 5, or 6;
a polyetheramine represented by Formula (IVb):

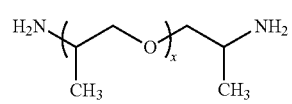

(IVb)

wherein:
x of formula (IVb) is about 2 to about 68;
a polyetheramine represented by Formula (IVc):

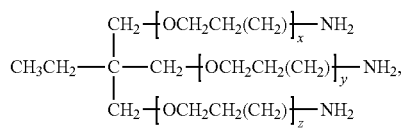

(IVc)

wherein:
each of x, y, and z is independently greater than 1; and
x+y+z of formula (IVc) is about 5 to about 85;
a polyetheramine represented by Formula (IVd):

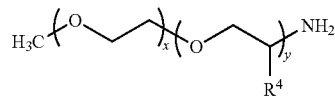

(IVd)

wherein:
$R^4$ of formula (IVd) is a hydrogen atom (H) for ethylene oxide (EO) or $R^4$ is $CH_3$ for propylene oxide (PO);
x of formula (IVd) is about 1 to about 40; and
y of formula (IVd) is about 1 to about 40;
a polyetheramine represented by Formula (IVe):

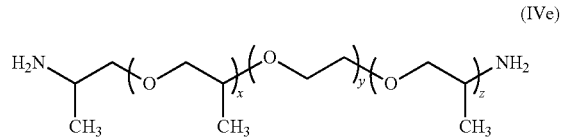

(IVe)

wherein:
x+z of formula (IVe) is about 1.2 to about 6; and
y of formula (IVe) is about 2 to about 39; and
combinations thereof.

Clause 37. The method of Clauses 19 to 36, wherein the epoxy resin has a weight average molecular weight (Mw) of about 340 g/mol to about 470 g/mol and an epoxy equivalent weight of about 170 g/mol to about 235 g/mol.

Clause 38. The method of Clauses 19 to 37, wherein the curing agent comprises an aromatic amine, a tertiary amine, or a combination thereof.

Overall, new and improved epoxy resin compositions and uses for epoxy resin compositions have been discovered that are capable of achieving filling, sealing, or other stabilization of apertures at shallow wellbore depths. The inventors have discovered that compositions having waterborne epoxies and surfactants of the present disclosure can de-emulsify at temperatures in a range from about 35° C. to about 100° C. (a shallow wellbore depth), such as about 90° C., to separate the waterborne epoxy from water and selectively promote curing of the epoxy to provide filling, sealing, or other stabilization of apertures at shallow wellbore depths while the separated water phase can be absorbed into the environment, evaporated out, or simply remain in the wellbore and not affect cured epoxy composition properties. Because de-emulsification of such compositions is temperature dependent, instead of time dependent or pH dependent, the composition components can be mixed (as an emulsion) at the Earth's surface and pumped into the wellbore at the convenience of the operator without hurry. In addition, the temperature-selective de-emulsification can provide fast curing (once de-emulsified) of the de-emulsified epoxy and curing agent, promoting aperture filling at selective shallow regions of the wellbore. Such temperature-dependent curing does not necessitate a secondary de-emulsification mechanism (such as pH or substantial additional additives such as high valency salts or acidic solutions), in addition to the temperature control, reduces or prevents unwanted wellbore plugging and can be limited to filling or sealing of apertures at shallow wellbore depths.

As used herein, reference to an R group, alkyl, substituted alkyl, hydrocarbyl, or substituted hydrocarbyl without specifying a particular isomer (such as butyl) expressly discloses all isomers (such as n-butyl, iso-butyl, sec-butyl, and tert-butyl). For example, reference to an R group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a monomer" include aspects comprising one, two, or more monomers, unless specified to the contrary or the context clearly indicates only one monomer is included.

While the foregoing is directed to aspects of the present disclosure, other and further aspects of the disclosure may be devised without departing from the basic scope thereof, and the scope thereof is determined by the claims that follow.

What is claimed is:

1. A method comprising:
   providing an emulsion to a wellbore, the emulsion comprising:
     an epoxy resin,
     a curing agent,
     a temperature responsive surfactant comprising a block copolymer having at least one hydrophilic block and at least one hydrophobic block; and
     water;
   de-emulsifying the emulsion in the wellbore at a temperature of about 35° C. to about 100° C., forming a water phase and an epoxy phase;
   applying the epoxy phase to a wellbore component; and
   curing the epoxy phase at the wellbore component after de-emulsifying the emulsion.

2. The method of claim 1, wherein the block copolymer surfactant comprises an ethylene oxide-propylene oxide copolymer having a molar ratio of ethylene oxide units to propylene oxide units of about 0.8 to about 1.2.

3. The method of claim 1, wherein the wellbore component is selected from the group consisting of an aperture of the wellbore, equipment disposed within the wellbore, sand disposed within the wellbore, and combinations thereof.

4. The method of claim 1, wherein de-emulsifying the emulsion occurs in the wellbore at a temperature of about 50° C. to about 95° C.

5. The method of claim 1, wherein the emulsion comprises the epoxy resin and the curing agent in a molar ratio of about 2:1 to about 1:2.

6. The method of claim 1, wherein the emulsion comprises the epoxy resin and the block copolymer surfactant in a weight ratio of about 1:1 to about 99.5:0.5.

7. The method of claim 1, wherein the hydrophilic block is selected from the group consisting of ethylene oxide units, isopropyl acrylamide units, hydroxylpropyl cellulose units, vinylcaprolactam units, 2-isopropyl-2-oxazoline units, vinylmethyl ether units, and combinations thereof.

8. The method of claim 1, wherein the hydrophobic block is selected from the group consisting of propylene oxide units, epoxy units, and combinations thereof.

9. The method of claim 1, wherein the block copolymer surfactant is a diblock copolymer comprising the hydrophilic block and the hydrophobic block.

10. The method of claim 9, wherein the hydrophilic block is selected from the group consisting of ethylene oxide units, isopropyl acrylamide units, hydroxylpropyl cellulose units, vinylcaprolactam units, 2-isopropyl-2-oxazoline units, vinylmethyl ether units, and combinations thereof.

11. The method of claim 10, wherein the hydrophobic block is selected from the group consisting of propylene oxide units, epoxy units, and combinations thereof.

12. The method of claim 9, wherein the hydrophobic block is selected from the group consisting of propylene oxide units, epoxy units, and combinations thereof.

13. The method of claim 1, wherein the block copolymer surfactant comprises a copolymer selected from the group consisting of Formula (I), Formula (II), Formula (III), and combinations thereof:

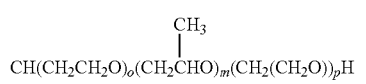
(I)

wherein each of o, m, and p of Formula (I) is independently 1 to 50 and the block copolymer surfactant of Formula (I) has a weight average molecular weight ($M_w$) of about 1,500 g/mol to about 8,000 g/mol and a molar ratio of ethylene oxide units to propylene oxide units of about 0.25 to about 1.5;

(II)

wherein each of m and n of Formula (II) is independently 10 about 60 and the block copolymer surfactant of Formula (II) has a weight average molecular weight ($M_w$) of about 1,500 g/mol to about 8,000 g/mol and a molar ratio of ethylene oxide units to propylene oxide units of about 0.25 to about 1.5;

(III)

wherein each of d and e of Formula (III) is independently 1 to 50, $R^3$ of Formula (III) is a hydrocarbon chain containing about 1 to about 22 carbon atoms, and the block copolymer surfactant of Formula (III) has a weight average molecular weight ($M_w$) of about 1,500 g/mol to about 8,000 g/mol and a molar ratio of ethylene oxide units to propylene oxide units of about 0.25 to about 1.5.

14. The method of claim 1, wherein the block copolymer surfactant comprises an ethylene oxide-propylene oxide block copolymer represented by Formula (I):

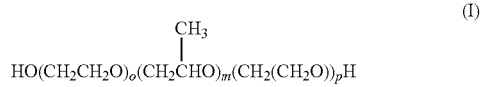
(I)

wherein each of o, m, and p is independently 1 to 50 and the block copolymer surfactant of Formula (I) has a weight average molecular weight ($M_w$) of about 1,500 g/mol to about 8,000 g/mol and a molar ratio of ethylene oxide units to propylene oxide units of about 0.25 to about 1.5.

15. The method of claim 1, wherein the block copolymer surfactant comprises an ethylene oxide-propylene oxide reverse copolymer surfactant represented by Formula (II):

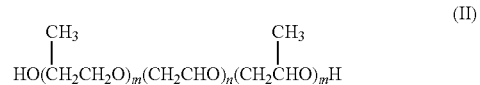
(II)

wherein each of m and n is independently 10 to 60 and the block copolymer surfactant of Formula (II) has a weight average molecular weight ($M_w$) of about 1,500 g/mol to about 8,000 g/mol and a molar ratio of ethylene oxide units to propylene oxide units of about 0.25 to about 1.5.

16. The method of claim 1, wherein the block copolymer surfactant comprises an ethylene oxide-propylene oxide alkoxylate represented by Formula (III):

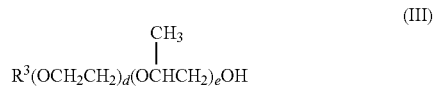
(III)

wherein each of d and e is independently 1 to 50, $R^3$ is a hydrocarbon chain containing 1 to 22 carbon atoms, and the block copolymer surfactant of Formula (III) has a weight average molecular weight ($M_w$) of about 1,500 g/mol to about 8,000 g/mol and a molar ratio of ethylene oxide units to propylene oxide units of about 0.25 to about 1.5.

17. The method of claim 1, wherein the epoxy resin has a weight average molecular weight (Mw) of about 340 g/mol to about 470 g/mol and an epoxy equivalent weight of about 170 g/mol to about 235 g/mol.

18. The method of claim 1, wherein the curing agent is selected from the group consisting of:
a polyamine represented by Formula (IVa):

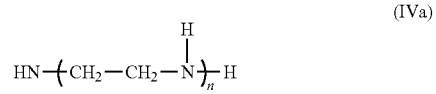
(IVa)

wherein:
n of formula (IVa) is 1, 2, 3, 4, 5, or 6;

a polyetheramine represented by Formula (IVb):

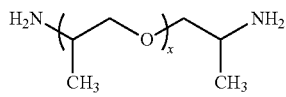
(IVb)

wherein:
x of formula (IVb) is 2 to 68;
a polyetheramine represented by Formula (IVc):

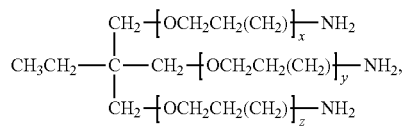
(IVc)

wherein:
each of x, y, and z is independently greater than 1; and
x+y+z of formula (IVc) is 5 to 85;
a polyetheramine represented by Formula (IVd):

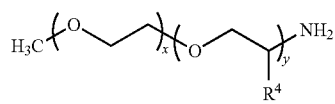
(IVd)

wherein:
$R^4$ of formula (IVd) is a hydrogen atom (H) for ethylene oxide (EO) or $R^4$ is $CH_3$ for propylene oxide (PO);
x of formula (IVd) is 1 to 40; and
y of formula (IVd) is 1 to 40;
a polyetheramine represented by Formula (IVe):

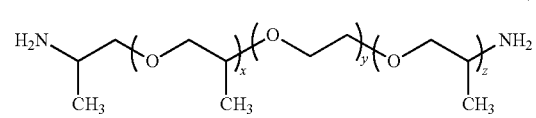
(IVe)

wherein:
x+z of formula (IVe) is 1.2 to 6; and
y of formula (IVe) is 2 to 39; and
combinations thereof.

19. The method of claim 1, wherein the curing agent comprises an aromatic amine.

20. The method of claim 1, wherein the curing agent comprises a tertiary amine.

* * * * *